US012282754B2

(12) United States Patent
McDonald

(10) Patent No.: US 12,282,754 B2
(45) Date of Patent: *Apr. 22, 2025

(54) INTEROPERABLE COMPOSITE DATA UNITS FOR USE IN DISTRIBUTED COMPUTING EXECUTION ENVIRONMENTS

(71) Applicant: Futureverse IP Limited, Auckland (NZ)

(72) Inventor: David McDonald, Auckland (NZ)

(73) Assignee: Futureverse IP Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,993

(22) Filed: Jun. 21, 2024

(65) Prior Publication Data
US 2024/0403006 A1 Dec. 5, 2024

Related U.S. Application Data

(63) Continuation of application No. 18/673,122, filed on May 23, 2024, which is a continuation of application
(Continued)

(51) Int. Cl.
*G06F 8/35* (2018.01)
*A63F 13/77* (2014.01)
(Continued)

(52) U.S. Cl.
CPC ............. *G06F 8/35* (2013.01); *A63F 13/77* (2014.09); *G06F 8/441* (2013.01); *G06N 20/00* (2019.01); *H04L 9/3213* (2013.01); *H04L 9/50* (2022.05)

(58) Field of Classification Search
CPC ............ G06F 8/35; A63F 13/77; G06N 20/00
(Continued)

(56) References Cited

U.S. PATENT DOCUMENTS

| 5,402,526 A | 3/1995 | Bauman et al. |
| 7,912,560 B2 | 3/2011 | Hood et al. |

(Continued)

FOREIGN PATENT DOCUMENTS

| CA | 3150262 A1 | 3/2021 |
| CN | 107169573 A | 9/2017 |

(Continued)

OTHER PUBLICATIONS

Szekely, Pedro, et al. "Declarative interface models for user interface construction tools: The M astermind approach." Engineering for Human-Computer Interaction: Proceedings of the IFIP TC2/WG2., Yellowstone Park, USA, Aug. 1995 6. Springer US, 1996. pp. 120-150 (Year: 1995).*

(Continued)

*Primary Examiner* — Satish Rampuria
(74) *Attorney, Agent, or Firm* — Potomac Law Group, PLLC, Marc S. Kaufman

(57) ABSTRACT

Disclosed implementations provide executable models, such as artificial intelligence models that can be owned, traded, and used in various execution environments. By coupling a model with a strictly defined interface definition, the model can be executed in various execution environments that support the interface. Coupling the model with a non-fungible cryptographic token allows the model and other components to be owned and traded as a unit. The tradeable composite units have utility across multiple supported execution environments, such as video game environments, chat bot environments and financial trading environments. Additionally, the interface allows for the creation of pipelines and systems from multiple complementary composite units.

7 Claims, 8 Drawing Sheets

Related U.S. Application Data

No. 18/612,121, filed on Mar. 21, 2024, now Pat. No. 12,039,300, which is a continuation of application No. 18/369,728, filed on Sep. 18, 2023, which is a continuation of application No. 17/353,898, filed on Jun. 22, 2021, now Pat. No. 11,797,274.

(51) Int. Cl.
    *G06F 8/41*     (2018.01)
    *G06N 20/00*     (2019.01)
    *H04L 9/00*     (2022.01)
    *H04L 9/32*     (2006.01)

(58) Field of Classification Search
    USPC .................................................. 717/100–124
    See application file for complete search history.

(56) References Cited

U.S. PATENT DOCUMENTS

| | | | |
|---|---|---|---|
| 10,621,013 | B2 | 4/2020 | Lavoie et al. |
| 10,748,072 | B1 | 8/2020 | Seeger et al. |
| 10,902,320 | B2 * | 1/2021 | Katz ..................... H04L 63/102 |
| 11,052,316 | B2 | 7/2021 | Wang et al. |
| 11,164,109 | B2 | 11/2021 | Browne et al. |
| 11,244,313 | B2 | 2/2022 | Padmanabhan et al. |
| 11,276,014 | B2 | 3/2022 | Augustine et al. |
| 11,288,280 | B2 | 3/2022 | Padmanabhan et al. |
| 11,374,755 | B1 | 6/2022 | Gaur et al. |
| 11,429,762 | B2 | 8/2022 | Mallya Kasaragod et al. |
| 11,431,486 | B2 | 8/2022 | Padmanabhan |
| 11,496,308 | B1 * | 11/2022 | Khan ..................... G06Q 20/223 |
| 11,710,027 | B2 | 7/2023 | Zhu et al. |
| 11,836,640 | B2 | 12/2023 | Ji et al. |
| 11,853,724 | B2 | 12/2023 | Hunter |
| 11,868,896 | B2 | 1/2024 | Brown et al. |
| 11,880,349 | B2 | 1/2024 | Padmanabhan |
| 11,991,299 | B1 * | 5/2024 | Rosenoer ............... H04L 63/123 |
| 12,008,472 | B2 * | 6/2024 | Cook ....................... G06N 7/01 |
| 12,165,118 | B2 * | 12/2024 | Yantis .................. G06Q 20/326 |
| 2013/0081005 | A1 | 3/2013 | Gounares et al. |
| 2016/0188622 | A1 | 6/2016 | Sharangpani |
| 2017/0147742 | A1 | 5/2017 | Jayaraman et al. |
| 2018/0293838 | A1 | 10/2018 | Arnone et al. |
| 2018/0314942 | A1 | 11/2018 | Shinn et al. |
| 2018/0357047 | A1 | 12/2018 | Brown et al. |
| 2019/0197402 | A1 | 6/2019 | Kovács et al. |
| 2019/0232172 | A1 | 8/2019 | Malan |
| 2019/0236562 | A1 | 8/2019 | Padmanabhan |
| 2019/0299105 | A1 | 10/2019 | Knight et al. |
| 2019/0354759 | A1 | 11/2019 | Somers et al. |
| 2019/0385136 | A1 | 12/2019 | Blagov et al. |
| 2020/0169546 | A1 | 5/2020 | Padmanabhan |
| 2020/0219093 | A1 * | 7/2020 | Malhotra ............. G06Q 20/389 |
| 2020/0250174 | A1 | 8/2020 | Padmanabhan et al. |
| 2020/0252404 | A1 | 8/2020 | Padmanabhan |
| 2020/0349142 | A1 | 11/2020 | Padmanabhan |
| 2020/0380303 | A1 | 12/2020 | Briancon et al. |
| 2021/0067339 | A1 | 3/2021 | Schiatti et al. |
| 2021/0143987 | A1 * | 5/2021 | Xu ......................... H04L 9/0819 |
| 2021/0149958 | A1 | 5/2021 | Hunter |
| 2021/0182423 | A1 | 6/2021 | Padmanabhan |
| 2021/0248653 | A1 * | 8/2021 | McKenzie ............ H04L 9/3247 |
| 2021/0357780 | A1 | 11/2021 | Ji et al. |
| 2021/0365840 | A1 | 11/2021 | Park et al. |
| 2022/0076164 | A1 | 3/2022 | Conort et al. |
| 2022/0188810 | A1 | 6/2022 | Doney |
| 2022/0358450 | A1 | 11/2022 | Stephens et al. |
| 2022/0405066 | A1 | 12/2022 | McDonald |
| 2022/0407702 | A1 | 12/2022 | Jakobsson et al. |
| 2023/0267128 | A1 | 8/2023 | Fourrier et al. |
| 2023/0281601 | A9 | 9/2023 | Doney |
| 2023/0385085 | A1 | 11/2023 | Singh |

FOREIGN PATENT DOCUMENTS

| | | |
|---|---|---|
| WO | 2021046541 A1 | 3/2021 |
| WO | 2021097259 A1 | 5/2021 |

OTHER PUBLICATIONS

Sekar, Ramachandran, et al. "Model-carrying code: a practical approach for safe execution of untrusted applications." ACM SIGOPS Operating Systems Review 37.5 (2003): pp. 15-28. (Year: 2003).*

Tenorth, Moritz, Daniel Nyga, and Michael Beetz. "Understanding and executing instructions for everyday manipulation tasks from the world wide web." 2010 IEEE international conference on robotics and automation. IEEE, 2010.pp. 186-1491 (Year: 2010).*

Fisher, Michael, and Michael Wooldridge. "Executable temporal logic for distributed AI In." Proceedings of the Twelfth International Workshop on Distributed Artificial Intelligence (IWDAI-93). 1993. pp. 131-142. (Year: 1993).*

Chard, Ryan, et al. "DLHub: Model and data serving for science." 2019 IEEE International Parallel and Distributed Processing Symposium (IPDPS). IEEE, 2019. pp. 283-292. (Year: 2019).*

Nilsson, Nils J. "A mobius automation: An application of artificial intelligence techniques." Proceedings of the 1st international joint conference on Artificial intelligence, IJCAI. vol. 69. 1969. pp. 509-520. (Year: 1969).*

Steinwold, "AI + NFTs: What is an iNFT?", Apr. 6, 2021, Available at: https://andrewsteinwold.substack.com/p/ai-nfts-what-is-an-inft-.

"AI Protocol History. Evolution of the AI Protocol"; AI Protocol Whitepaper; downloaded from https://docs.aiprotocol.info/ai-protocol-history, pp. 1-2.

Andersson, Per et al.: "Movie-an interactive environment for silicon compilation tools", IEEE transactions on computer-aided design of integrated circuits and systems 8.6 (1989): pp. 693-701. (Year: 1989).

Andrade, Henrique, et al.: "Optimizing the execution of multiple data analysis queries on parallel and distributed environments", IEEE transactions on parallel and distributed systems 15.6 (2004): pp. 520-532. (Year: 2004).

Babichenko, Dmitriy et al.: "The Use of Agent-Based Models As Non-Player Characters in Serious Games", 2020 IEEE 8th International Conference on Serious Games and Applications for Health (SeGAH). IEEE, 2020.pp. 1-8 (Year: 2020).

Balint, J. Timothy et al.: "Understanding everything NPCs can do: metrics for action similarity in non-player characters", Proceedings of the 13th international conference on the foundations of digital games. 2018.pp. 1-10. (Year: 2018).

Carey, Michael J., et al.: "Shoring up persistent applications", Proceedings of the 1994 ACM SIGMOD international conference on Management of data. 1994.pp.383-394 (Year: 1994).

Chiang, Mung et al.: "Fog and IoT: An overview of research opportunities", IEEE Internet of things journal 3.6 (2016): pp. 854-864. (Year: 2016).

Diaz, Guillermo et al.: "Evolutionary behavioral design of non-player characters in a FPS video game through particle swarm optimization", 2019 13th International Conference on Software, Knowledge, Information Management and Applications (SKIMA). IEEE, 2019. pp. 1-8 (Year: 2019).

Dwyer, Matthew B. et al.: "Model checking graphical user interfaces using abstractions", ACM SIGSOFT Software Engineering Notes 22.6 (1997): pp. 244-261. (Year: 1997).

Epperly, Thomas, et al.: "Composite parallelism: Creating interoperability between PGAS languages, HPCS languages and message passing libraries", Technical report LLNL-AR-499171, 2011.pp. 1-31 (Year: 2011).

Etherscan.io; downloaded from https://etherscan.io/address/0xa189121eE045AEAA8DA80b72F7a1132e3B216237#code, pp. 1-6.

Foerster, Jakob N., et al.: "Learning to Communicate with Deep Multi-Agent Reinforcement Learning", arXiv:1605.06676v2 [cs.AI], May 24, 2016.

GitHub—Universe: a software platform for measuring and training an AI's general intelligence across the world's supply of games, websites and other applications, pp. 1-7.

(56) References Cited

OTHER PUBLICATIONS

GitHub-openai/gym: A toolkit for developing and comparing reinforcement learning algorithms accessed on Jan. 24, 2025, pp. 1-5.
Gym Documentation; 7 pages.
Gymnasium: An API standard for reinforcement learning with a diverse collection of reference environments pp. 1-1.
Hubbold, Roger, et al.: "GNU/Maverik: A micro-kernel for large-scale virtual environments", Proceedings of the ACM symposium on Virtual reality software and technology. 1999. pp. 66-73 (Year: 1999).
INFT // To the Young Artists of Cyberspace—Natively Digital—A Curated NFT Sale—2021—Sotheby's pp. 1-8.
International Preliminary Report on Patentability issued in PCT Patent Application No. PCT/IB2022/055797, dated Sep. 29, 2022.
International Search Report and Written Opinion issued in PCT Patent Application No. PCT/IB2022/055797, dated Sep. 29, 2022.
International Search Report and Written Opinion issued in PCT Patent Application No. PCT/IB2024/050941, dated Apr. 24, 2024.
International Search Report and Written Opinion issued in PCT Patent Application No. PCT/IB2024/050944, dated Apr. 17, 2024.
International Search Report and Written Opinion issued in PCT Patent Application No. PCT/US24/43724, dated Nov. 5, 2024.
Kundu, Sajib, et al.: "Modeling virtualized applications using machine learning techniques", Proceedings of the 8th ACM SIGPLAN/SIGOPS conference on Virtual Execution Environments. 2012. pp. 3-14 (Year: 2012).
Ledeczi, Akos, et al.: "Composing domain-specific design environments", Computer 34.11 (2001): pp. 44-51. (Year: 2001).
McConaghy, Trent, et al.: "Towards An Ownership Layer for the Internet", Ascribe GMBH, Version 1.03, Jun. 24, 2015.
Mnih, V., et al.: "Human-level control through deep reinforcement learning", Nature, vol. 518, Feb. 26, 2015.
Multi-Agent_AI_DAO, "General-Purpose Decentralized Autonomous Organisation", www.montreal.ai; 20 pages.
Natella, Roberto, et al.: "Analyzing the effects of bugs on software interfaces", IEEE Transactions on Software Engineering 46.3 (2018): pp. 280-301. (Year 2018).
Ngu, Anne HH, et al.: "Semantic-based mashup of composite applications", IEEE Transactions on Services Computing 3.1 (2010): pp. 2-15. (Year: 2010).
Panagou, Eleni et al.: "Towards an open and decentralized case law curation ecosystem", Plos one 15.10 (2020): pp. 1-30. (Year: 2020).
Stripf, Timo, et al.: "A compilation-and simulation-oriented architecture description language for multicore systems", 2012 IEEE 15th International Conference on Computational Science and Engineering. IEEE, 2012. pp. 383-390 (Year: 2012).
Vaswani, A., et al.: "Attention is all you need", 31st Conference on Neural Information Processing Systems (NIPS 2017), arXiv:1706.03762v7 [cs.CL], Aug. 2, 2023.
Yan, Ying, et al.: "Confidentiality support over financial grade consortium blockchain", Proceedings of the 2020 ACM SIGMOD International Conference on Management of Data. 2020. pp. 2227-2240 (Year: 2020).
Zyskind, Guy: "Efficient secure computation enabled by blockchain technology", Diss. Massachusetts Institute on Technology, 2016. pp. 1-128 (Year: 2016).

\* cited by examiner

```
1   public Keycode moveUp = KeyCode. W;
2   public Keycode movedown = KeyCode. S;
3    public float speed = 10.0f ;
4   public float boundy = 2.25f ;
5   private Rigidbody2D rb2d ;
6
7   void Start () {
8       rb2d = GetComponent<Rigidboby2D>();
9   }
10
11  void Update () {
12      var vel = rb2d . velocity;
13      if (Input.GetKey (moveUp)) {
14         vel.y = speed ;
15      }
16      elese if (Input.GetKey(moveDown|)) {
17             vel.y = - speed ;
18      }
19      else {
20         vel.y = 0 ;
21      }
22      rb2d.velocity = vel ;
23
24      var pos = transform.position ;
25          if (pos.y > boundy) {
26             pos.y = boundy ;
27      }
28      else if (pos.y < -boundy) {
29             pos.y = -boundy ;
30      }
31      transform.position = pos ;
32  }]
```

FIG. 4

INTEROPERABLE COMPOSITE DATA UNITS FOR USE IN DISTRIBUTED COMPUTING EXECUTION ENVIRONMENTS

BACKGROUND

Computing execution environments, such as distributed video game environments, bot networks, and complex financial transaction environments have become ubiquitous. In many such environments, participants can be represented as an object with privileges and characteristics. For example, in a video game environment, a player avatar may have specific capabilities, such as speed, agility, and strength. The capabilities associated with the player avatar can be stored within the execution environment. However, each environment has its own formats and protocols. Further, these environments must have a centralized trusted authority that is the keeper of the data. Accordingly, use of the objects must remain in the creating execution environment and activity in other environments does not, and cannot, affect the object. Further, the need for a trusted party prevents implementation of such objects on decentralized computing execution environments, such as blockchain networks and other distributed ledger technology (DLT).

BRIEF SUMMARY

Disclosed implementations provide executable models, such as artificial intelligence models that can be owned, traded, and used in various execution environments. By coupling a model with a strictly defined interface definition, the model can be executed in various execution environments that support the interface. Coupling the model with a non-fungible cryptographic token allows the model and other components to be owned and traded as a unit. The composite data structure representing the model is referred to as a "composite unit" herein. The tradeable composite units have utility across multiple supported execution environments, such as video game environments, chat bot environments and financial trading environments. Additionally, the interface allows for the creation of pipelines and systems from multiple complementary composite units.

An aspect of the invention is a method for creating a composite data structure recorded on non-transitory computer readable media for providing a computation model that can be implemented in multiple execution environments, the data structure comprising: a model module specifying model code that, when executed by a computer processor, causes computation on data in accordance with the computation model; an interface definition module including a pointer to an interface definition associated with the computation model; and a non-fungible token module including a pointer to a non-fungible token associated with the computation module, where the non-fungible token is stored on a decentralized ledger.

Another aspect of the invention is the use of the composite data structure within an execution environment.

Another aspect of the invention is a system including an execution environment for using the data structure.

BRIEF DESCRIPTION OF THE DRAWING

The foregoing summary, as well as the following detailed description of the invention, will be better understood when read in conjunction with the appended drawings. For the purpose of illustrating the invention, there are shown in the drawings various illustrative embodiments. It should be understood, however, that the invention is not limited to the precise arrangements and instrumentalities shown. In the drawings:

FIG. 4 is an example of a code snippet of the model code in accordance with disclosed implementations.

DETAILED DESCRIPTION

Certain terminology is used in the following description for convenience only and is not limiting. Unless specifically set forth herein, the terms "a," "an" and "the" are not limited to one element but instead should be read as meaning "at least one." The terminology includes the words noted above, derivatives thereof and words of similar import.

The composite units in accordance with disclosed implementations provide trade-ability, interoperability and composability of models, such as artificial intelligence that can be implemented in various execution environments and moved from one execution environment to another. By coupling an execution model with a strictly defined interface definition, the composite unit allows multiple execution environments to implement support for the interface and for other models to fit into that interface. The result is the ability to own and trade composite units that have utility across multiple supported execution environments. Additionally, the interface allows for the creation of pipelines and systems from multiple complementary composite units.

A composite unit in accordance with disclosed implementations includes 3 components:

Execution Model: a specification of executable code implementing the model (e.g., a content addressed URL where an executable code AI model is stored and accessible);

Interface Definition: a specification of inputs accepted by the model and outputs of the model (e.g., a content addressed URL where an interface definition for the relative model is stored and accessible).

Blockchain Reference: A pointer to a Non-Fungible Token (NFT) corresponding to the model and stored on a decentralized computing network, such as a blockchain or other distributed ledger technology.

Figure 1:
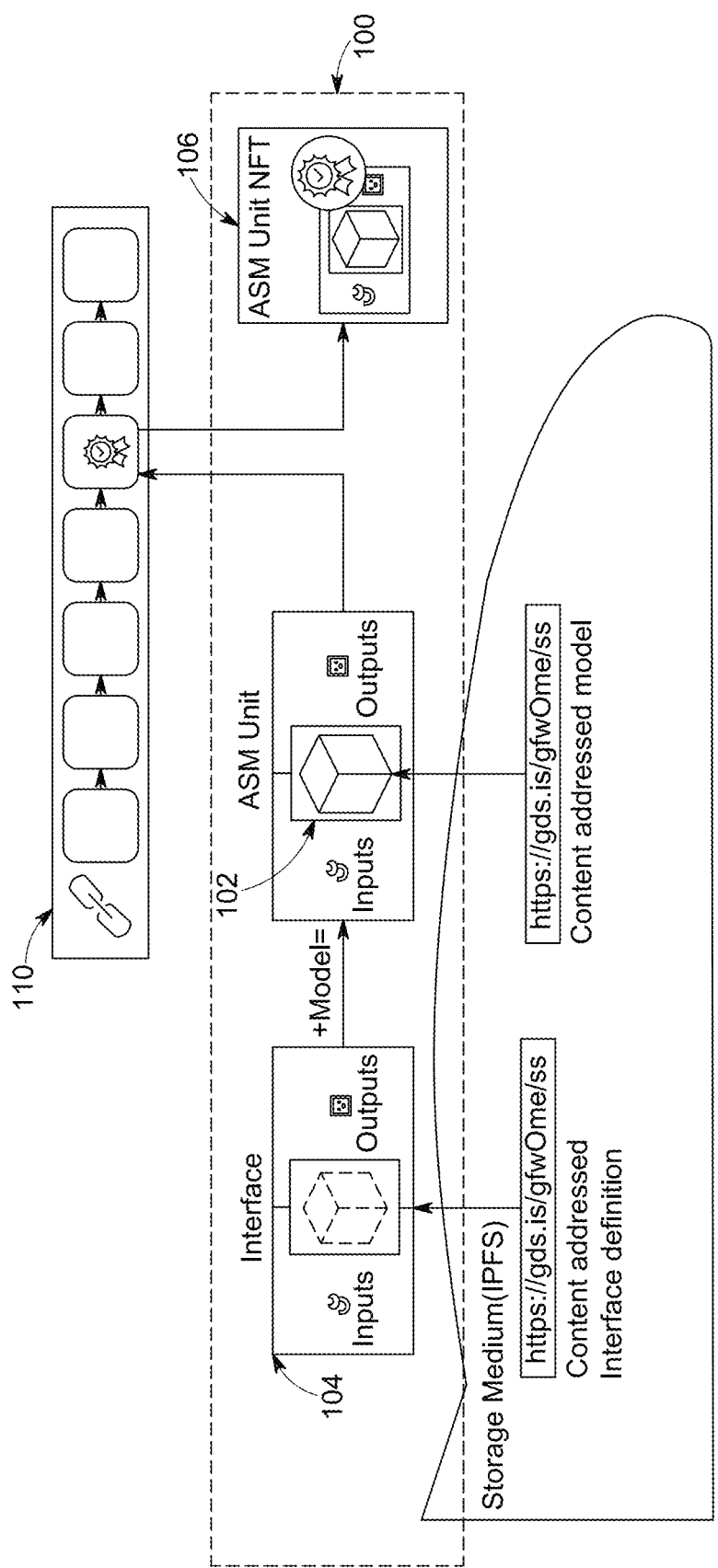
FIG. 1 is a schematic representation of the structure of a composite unit in accordance with disclosed implementations.

FIG. 1 illustrates the architecture of a composite unit in accordance with disclosed implementations. Composite unit 100 includes content addressed model 102, interface specification 104, and token pointer 106 (which associates the composite unit 100 with an NFT stored on decentralized ledger 110. Note that elements 102, 104, and 106 are data elements stored on non transient computer-readable media as a data structure. The elements can be linked in various manners, such as with pointers, by being stored in a single data structure, through relational tables, or the like. Also, the elements can store the corresponding data or code, or can otherwise specify the data or code through a URL or other address, a link, or the like. For example, content addressed model 102 can include the model code for executing the model or, as illustrated in FIG. 1, include an address to the storage location of the model code. Decentralized ledger 110 can be part of a decentralized environment such as a blockchain network. The NFT is a unique token that can be used to identify and represent ownership of composite unit 100, regardless of the executing environment in which composite unit 100 is being used at the time.

Figure 2:
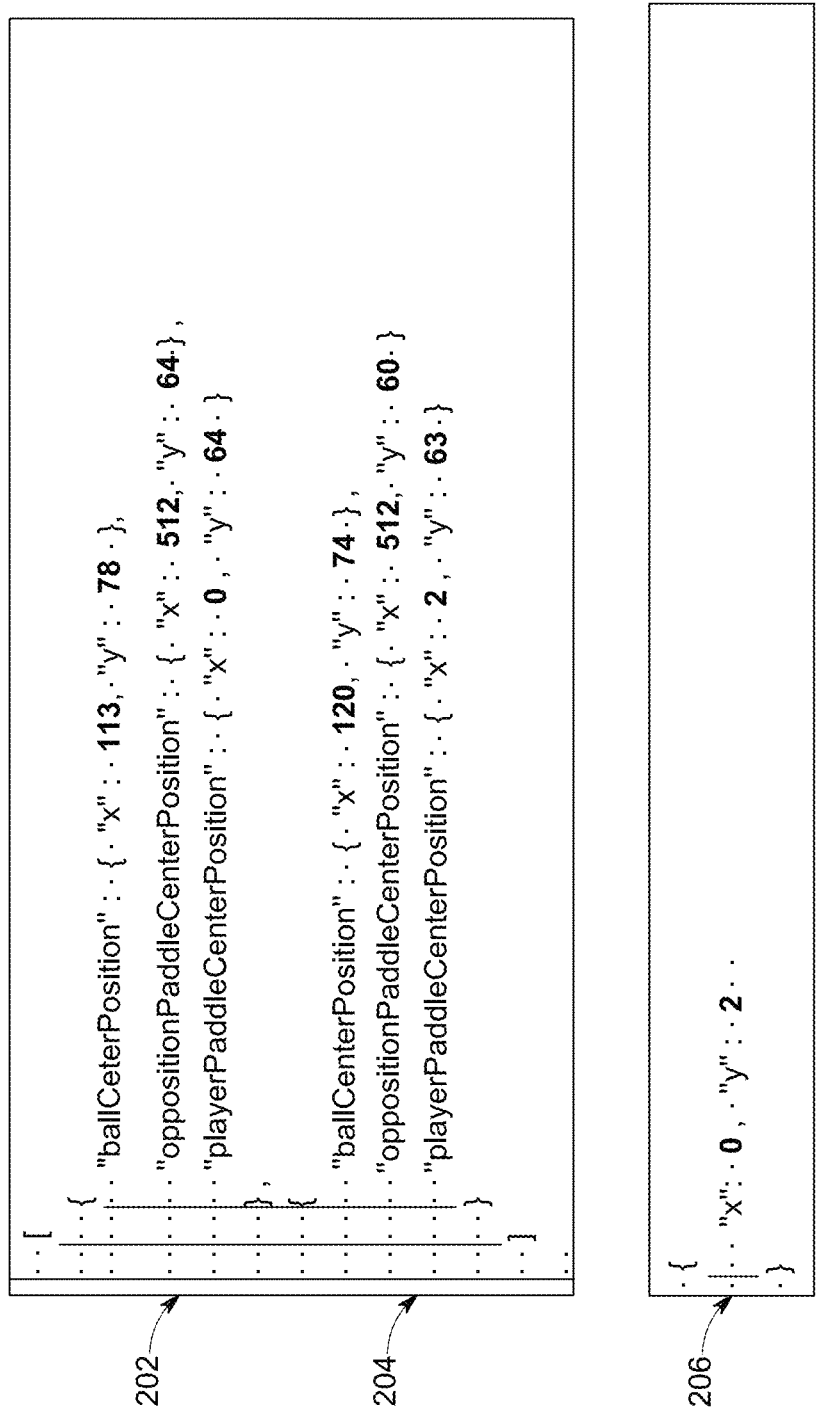
FIG. 2 is an example of code for an interface definition in accordance with disclosed implementations.

As a simple example of composite unit 100, consider the classic computer game PONG™. An example interface definition for a composite unit for the computer game PONG™ is shown in FIG. 2. As illustrated in FIG. 2, the input, from the most recent N (N=2 in this example) frames of game play are shown at 202 and 204. The inputs include x and y positions of the ball, and each player's paddle, from which the following can be deduced:

Ball position, speed, and trajectory;
Opponents paddle position, speed, and trajectory; and
Player's own paddle position, speed, and trajectory.

The output of the interface in this example is the player's paddle movement instructions for the next frame, as shown at 206. The x and y values will be added to the current player's paddle position.

By defining a strict interface for model inputs and outputs the models can be deployed across multiple environments that provide support for that interface. The constraints of standard PONG™ are very simple and the physics are linear, but this interface could be applied to multiple variants with different constraints and physics. By tweaking the number frames taken as input, models could be trained for a game variant with more complex constraints and non-linear physics. The disclosed implementations can be used to create a diverse ecosystem of competitive PONG™ tournaments where AI models are trained to compete across the field in different variants of the game. Disclosed implementations can be applied to more complex environments in gaming and beyond as described in examples below.

Composite units can be linked across execution environments (referred to as "arena's" herein) via an input value matrix which is a data structure containing a set of values that can be mapped to input variables within the arena and composite unit. This allows both consistency and flexibility in how the composite units are deployed by providing a single input reference but giving the arena developers the choice on how they are mapped. Arenas can refer to any environment the composite unit might interact with, examples include a level within a video game, an entire game, a trading bot, and/or a single interaction. "arena agents" are the code that executes the outputs of the composite unit.

Figures 1, 3:
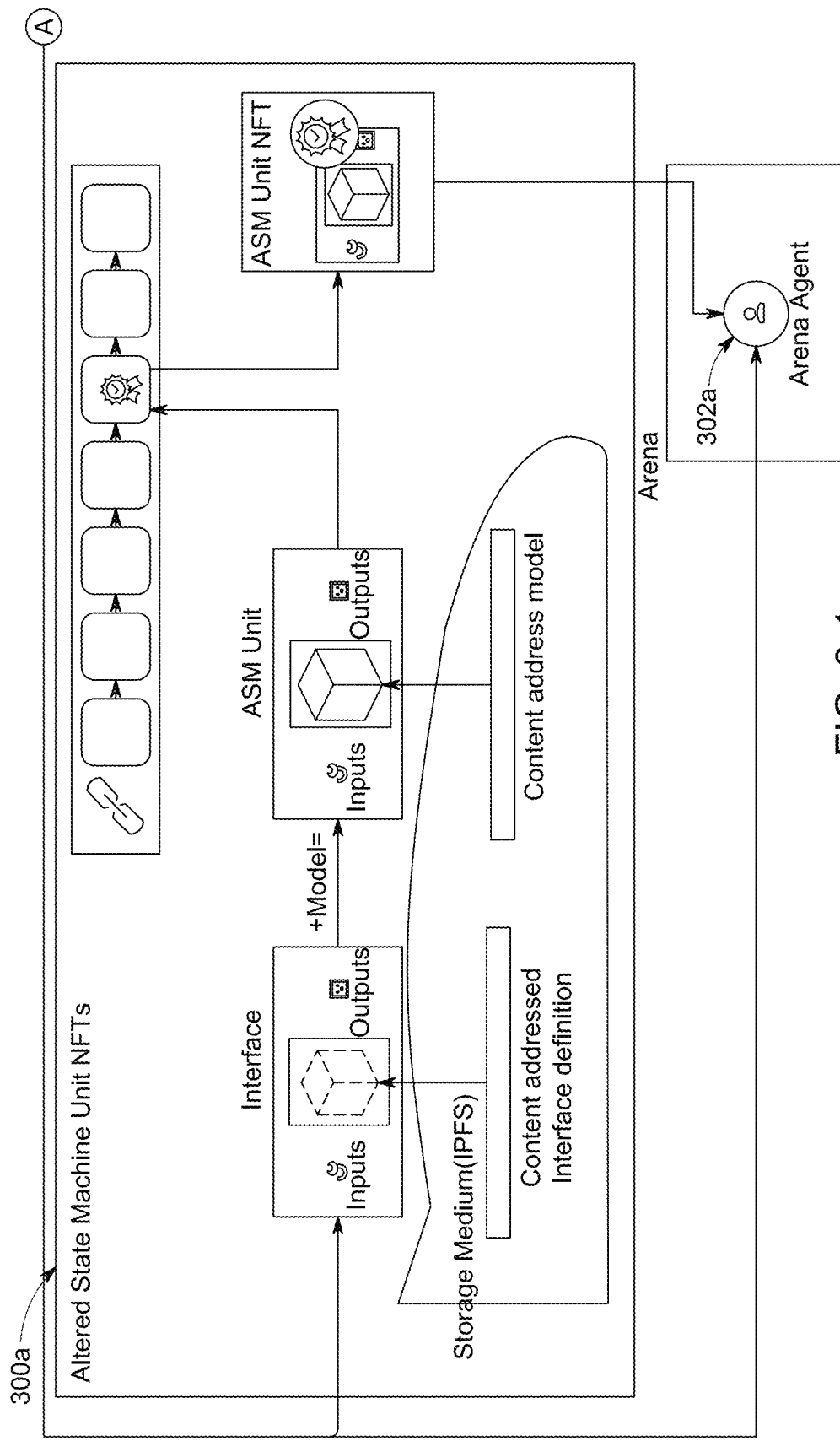
FIG. 3 is a schematic illustration of linking between composite units and an input value matrix in accordance with disclosed implementations.
Figures 2, 3:
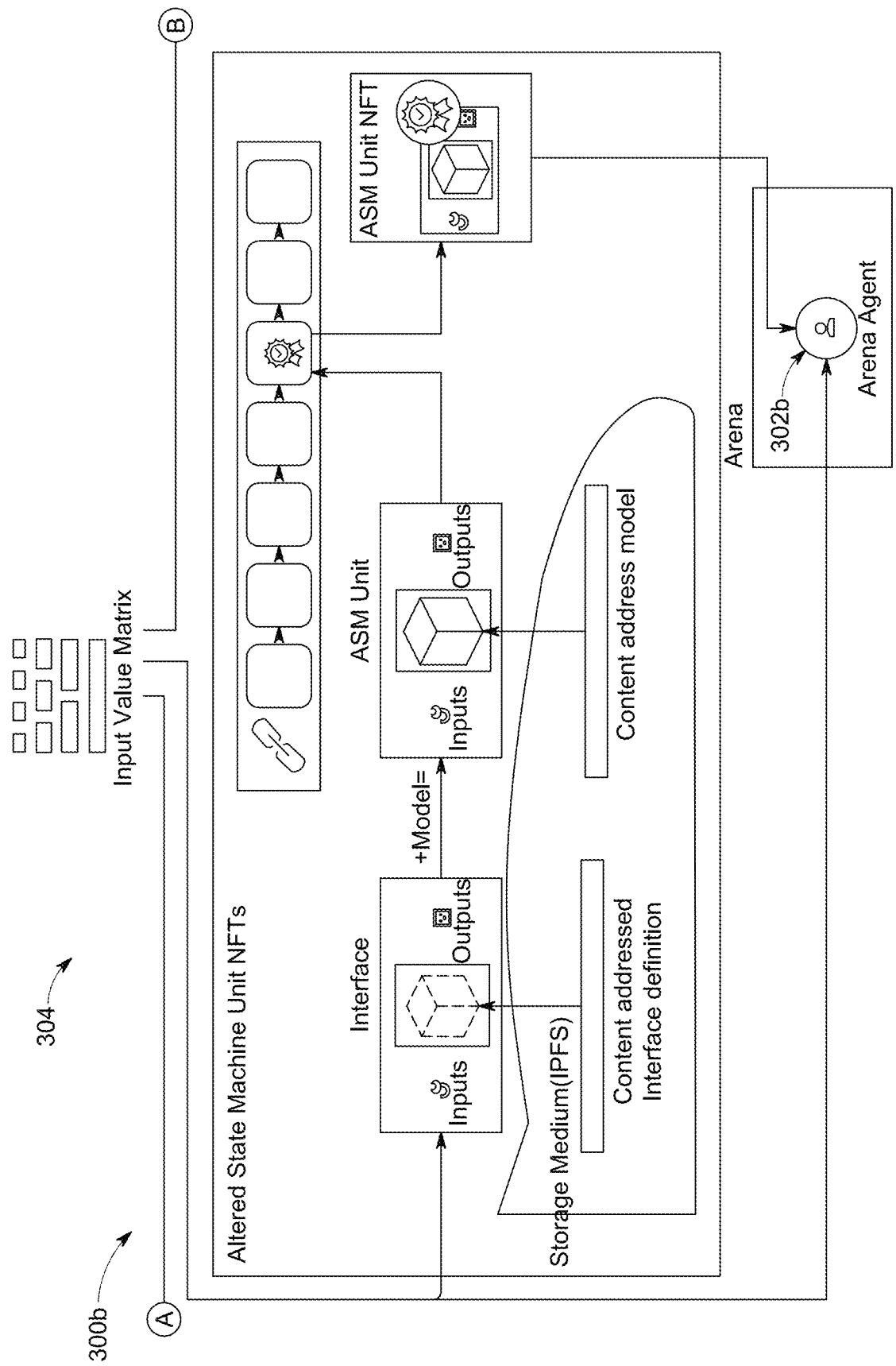
Figure 3:
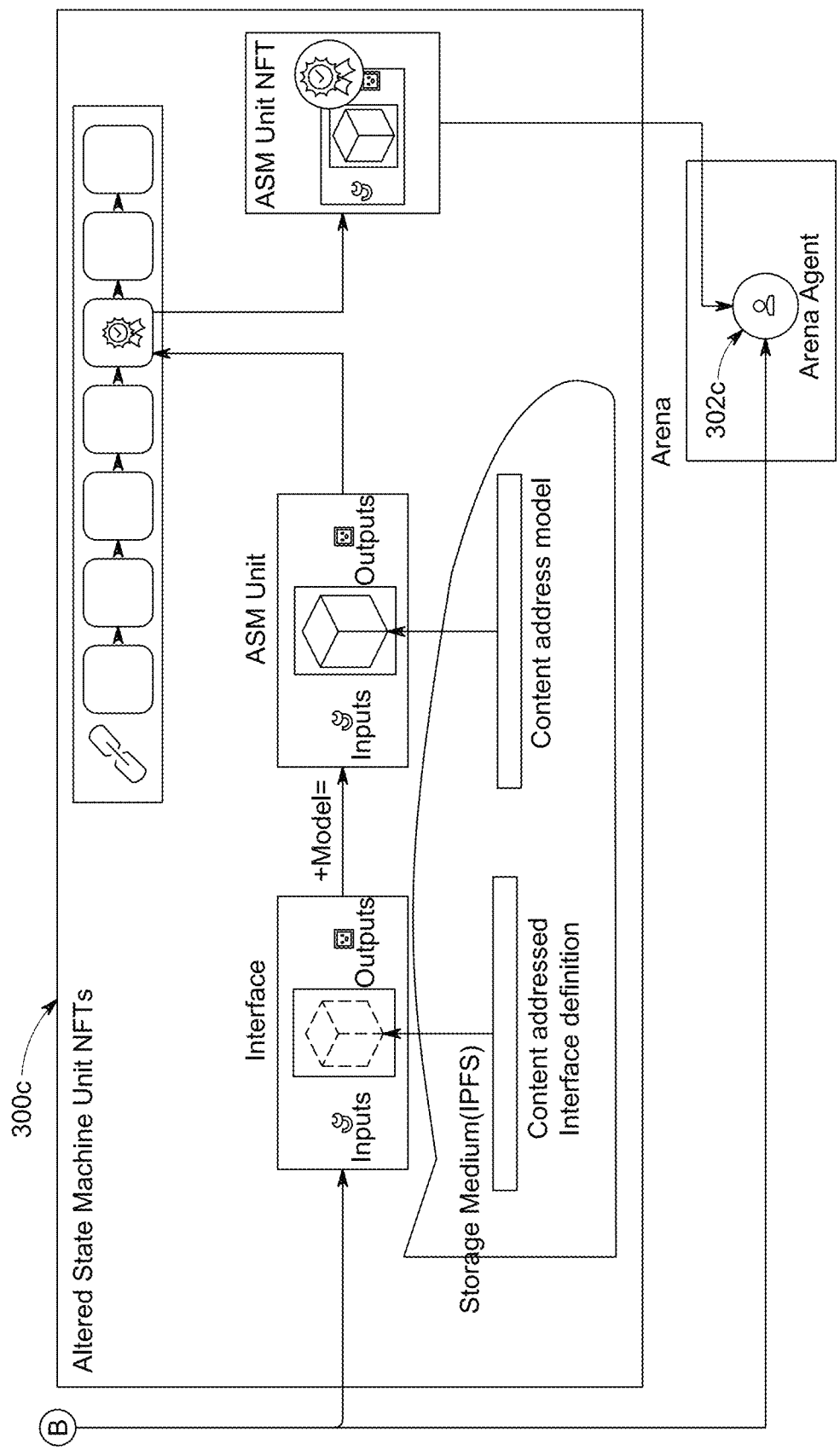

FIG. 3 illustrates multiple composite units, one for each arena, coupled to an input value matrix. Each composite unit, 300a, 300b, and 300c in this example, has a corresponding arena agent 302a, 302b, and 302c. Input value matrix 304 is coupled to each composite unit through the corresponding arena agent.

A very simple example input value matrix, in table form, is set forth below.

| | |
|---|---|
| Value 1 | 5 |
| Value 2 | 2 |
| Value 3 | 6 |

With respect to the video games PONG™ and SPACE INVADERS™, application of the input value matrix might be as follows. In PONG™, an arena developer might want to add a constraint to the agent for maximum paddle speed, this can be achieved by mapping Value 3 in the input value matrix to the speed variable within the controller script, which can be part of model of the corresponding composite unit 100 (see FIG. 1). A snippet of an example of model code which controls movement of the paddle is illustrated in FIG. 4. The speed variable is indicated at 402. In an example relating to SPACE INVADERS™, an arena developer might want to add a constraint to the agent for maximum speed of the space craft by mapping Value 3 to the input value for the variable speed, indicated at 502, within the controller script shown in FIG. 5 (which is an example of a snippet for controlling space craft movement in the game).

Figure 5:
FIG. 5 is another example of a code snippet of the model code in accordance with disclosed implementations.
Figure 6:
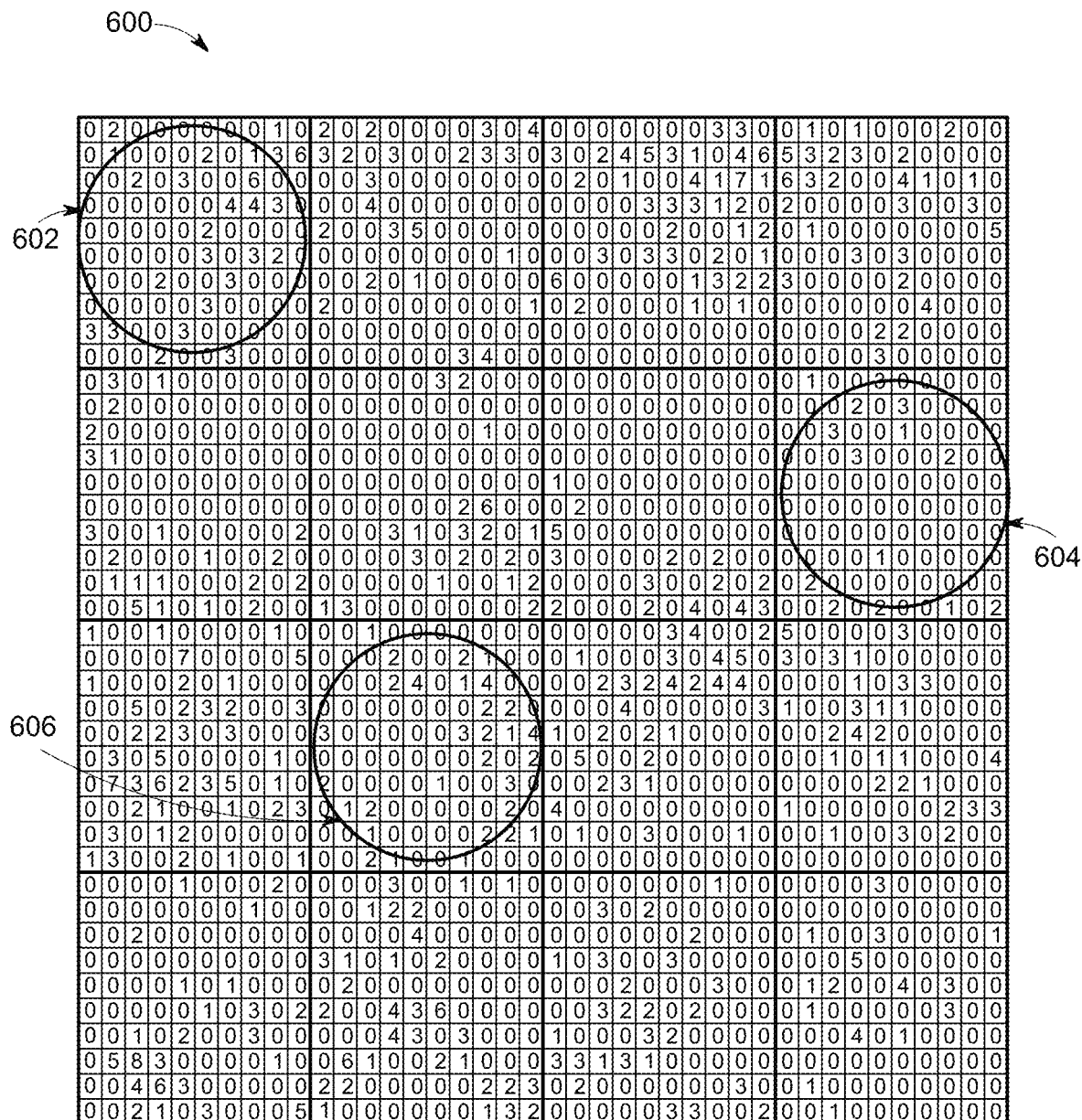
FIG. 6 is a table illustrating an input value matrix accordance with disclosed implementations.

The input value matrix described with respect to FIG. 3, FIG. 4 and FIG. 5 is a very simple example for illustrative purposes. FIG. 6 illustrates a more complex input value matrix 600 in accordance with disclosed embodiments. At least some of the variables in the input value matrix 600 represent attributes of a player entity in a video game. In the example of FIG. 6, a set of variables can be related to a category of attributes. For example, attributes 602 represent strength of the player entity with respect to the relevant arena, attributes 604 represent intelligence of the player entity with respect to the relevant arena, and attributes 606 represent agility of the player entity with respect to the relevant arena. Each set of values in input value matrix can be mapped to an array of variables in model code or each variable can be mapped to an individual variable in the model code. The input value matrix can be randomly generated and each game developer can designate/tag areas of the matrix as corresponding to specific skills. Tags can be associated with each area and game developers can leverage the tags created by previous developers to create a similar skill set for a similar game. Developers of different types of games may choose to create and or use a set of tags that is very different from a set of tags for a different game. Therefore, the input value matrix can be a set of values and associated TAG cloud(s) that can be used/grouped/tagged as desired. The game developer can decide which tags to use based on the type of game and desired play characteristics, but likely would want to be consistent with other similar games.

As noted above, the composite unit in accordance with disclosed implementations can be applied to video games. Disclosed implementations of a gaming platform and protocol example are described in greater detail below. The platform allows users to mint game player entities (referred to simply as "players" below) and upgrade their statistics, earn, buy, and sell them as NFTs within the ecosystem. The model code incorporates machine learning to create a "brain" that can change and adapt within, and as a result of, gameplay.

The protocol and platform allow multiple games to be created by developers to interact with players. Different players can have different levels of various relevant skills (such as strength, speed, intelligence, . . . ). A player may be an interactive intelligent non-player character (NPC) in a game with human backed players. An NPC is character or other entity in a game that is not controlled by the person(s) playing the game. A player can be defined by 3 parts, the base "frame", a "form" defining the player's aesthetic and attributes (for example, the frame and form can be in the form of the input value matrix defined above), and a trainable "brain" (for example in the form of the executable model described above. A user can create new players by minting a new NFT Pack including these components with default attributes. Some frames, forms and/or brains will contain rare attributes or may start from a higher level in their potential meaning, for example, that the corresponding player is a faster learner who take less time to reach the pinnacle of certain skills.

To play a game, a frame, form, and brain are selected and linked to one another. With gameplay each component will be modified in unique ways. The combination of frame, form and brain impact the learning model and can produce an extremely large set of decision making processes and combinations in the specific machine learning model storage for the player (i.e., the brain). Simply attaching a "more advanced" brain or "more capable" form to a frame might not immediately result in a superior player because a brain that has been trained to use a form with certain attributes will need to relearn when combined with a form with different attributes or with different values for those attributes. Even two frames with forms and brains with identical attributes might also develop totally different training in the brain model based on game play. This allows for an enormous universe of unique "personalities" to develop.

This model of separating attributes and attribute values, which can be attached and detached from a frame, allows users to design the ultimate strategy by combining unique parts of the player from different frames, forms and brains. Significantly, this structure allows a user to choose a form for a specific arena or a brain for a specific task or strategy or when facing a specific opponent. Each form or brain can be categorized, for example, as 1 of 5 types; Defective, Common, Rare, Epic, and Legendary. The Players can be defined using a .yaml file that holds the attributes and is stored using IPFS. YAML is a serialization language that is often used as a format for configuration files as a replacement for languages like JSON. IPFS is a well-known peer-to-peer hypermedia protocol. YAML is only one example of a file structure/format that could be used to store data defining a player and attributes. As a result of this configuration, "memories" are immutable, decentralized, and can be linked specifically to an NFT.

A frame includes a set of universal attribute values assigned at minting. The values can start low but could be upgraded by completing tasks in the platform and/or purchasing boosts with the platform currency. For example, the frame attribute values can correspond to:

Strength;
Fitness;
Speed;
Dexterity;
Intelligence;
Charisma;
Perception;
Luck; and/or
Size Forms can be game-specific and can have attribute values providing additional skills or attributes, to modify skills and attributes, for a specific task, such as a game against a specific opponent. In order to enter an arena, an arena specific form can be required to be attached to the frame. This allows a frame to participate in multiple arenas if it has multiple forms. Forms can also contain multipliers of frame stats that might be useful for a specific arena. These can be randomly assigned and can include rare attributes. Once a form is minted, games can upgrade skill levels internally through mapping multipliers or the like.

Brains can be defined as frames, i.e. a memory address associated with an NFT and storing the code for executing a learning model. Brains can be used with various forms. However, a new form may require the brain to learn how to use the modified attributes and attribute values specified therein. Brains also have attributes which can boost the attached frame and might be more useful to a specific arena(s). Frames can contain multiple memories which store the training for a specific learning model and form combination to thereby allow training for several combinations for a specific arena.

In order for a brain to learn, it needs to be trained through activity, e.g., game play. Training can be accomplished in a "gym" platform. A "gym", as used herein, can be a GPU-powered machine learning model trainer. The model is influenced by the attributes associated with the player NFT. As the learning model of the brain uses a neural network, the specific outcomes of training a specific player are unique. Players are able to model their attributes by training at a gym, which in turn makes their AI better at playing the game. Each player can have an .onnx file that is updated each time they train at the gym. ONNX is an open format built to represent machine learning models. Training at the gym can be a process similar to mining cryptocurrency, where GPUs are used to train the unique brain of your NFT. The protocol can provide an incentive to those who host the gym as the users of the gym can be required to pay for gym usage. During a gym session a user will be able to see their player improve, by monitoring the attributed through a file viewer for example, and be able to end the session once their decided outcome is achieved.

Users can connect to a game using their web3 wallet. The user then selects a player which is a combination of frame, form, brain and memory. Multiple players can be selected to create a team in the case of team play such as football. Two teams are required for a match/game. The game starts and the players are loaded, the game checks to ensure that NFT associated with the combination of frame, form, brain and memory is owned by the user when they enter the arena. The two sides compete to score enough winning points/goals in a specific time period.

The output of this result can be stored on a distributed ledger, such as a blockchain network against the record of the relevant NFTs. This enables an ecosystem of economic incentives and activities to develop around the players and the outcomes of Games. Game, player, and team stats can be displayed in various manners. Users can view an inventory of their frames, forms and brains as well as the makeup of their players and how the stats impact the players. A user interface can be provided to allow players to be modified by attaching a combinations of frames/forms/brains. Users could wager on the outcome of games or rent a team to play a match or borrow a player to upgrade their team.

The platform includes a distributed ledger having a native token to be used for the payments noted herein. The token can be mined using a liquidity mining event. Once a user holds a native token, the user can use the native token to mine (or buy) a pack of a frame/form/brain combination. Packs will have a random chance of spawning a rare component of each. Mining can be based on a fair distribution curve, and a minimum stake can be required to mine a pack. The time it takes to mine can be reduced based on a user's staked amount. This allows early or strong supporters to benefit as well as later or smaller supporters to participate.

To make the game fair even for smaller participants, an increase in stake need not necessarily increase your individual chance of getting a rare attribute upon minting of an NFT. However, larger stakeholders could be able to mine more packs in the same amount of time with respect to smaller stakeholders. Packs can be released in editions and, over time, editions can contain new attributes as the models evolve or some editions may contain limited runs. However, because the performance of a player is determined by its training and experience even a "low" spec character has a chance of developing a winning capability/strategy. The native token can also be used for the payments between providers of GPUs to gyms and users of those gyms. Native tokens can also be used to purchase players from other users, to buy access to an arena, or to purchase cosmetic items or loot boxes for players.

Various known technology platforms and protocols can be used in connection with the disclosed implementations. The NFTs can be minted using the ERC-1155 token standard. Such NFTs are specifically for gaming and enable more efficient trade and transfer on the Ethereum network than is possible through ERC-721 alternatives.

CHAINLINK™ RNG (Random Number Generator) and VRF (Verified Randomness Function) can be used to provide randomness both in game mechanics (such as a coin toss for where the ball starts) and in minting mechanics for rare attributes associated with the NFTs. The Chainlink oracle network can also be used to enable the NFTs to have dynamic attributes which build up during game play. SYLO protocol, an ecosystem made up of digital consumer wallet software, applications, infrastructure & developer tools, can be used for in game chat and marketplace chat as well as for NFT wallets. IPFS can be used for storing the memories associated with an NFT and ensuring the brain in a game is using the correct NFT. UNITY can be used for the game engine.

The specific examples described above relate primarily to video games. However, the disclosed implementations can be applied to various applications and the "player" entity could be, for example, a chat bot (to give an individual personality to an online friend), a personal assistant that is truly personal, and/or a trading bot which acts on behalf of its owner or its community to accomplish transactions in accordance with a dynamic trading strategy. Any task that could be completed by an intelligent automated agent could be accomplished using the disclosed implementations.

It will be appreciated by those skilled in the art that changes could be made to the disclosed implementations without departing from the broad inventive concept thereof. It is understood, therefore, that this invention is not limited to the disclosed implementations, but it is intended to cover modifications within the spirit and scope of the present invention as defined by the appended claims.

What is claimed:

1. A computing platform for creating a computation model configured to be implemented on a computing network of an execution environment, the computation model including computer code recorded on non-transitory computer media the computing platform comprising:
    a model receiving module recorded on non-transitory computer readable media and, when executed by a computing processor, is operative to receive model code that is addressable on the computing network, the model code, when executed by a computer processor, causes computation on data in accordance with a computation model, wherein the model code includes an artificial intelligence machine learning model including an artificial neural network;
    an interface definition module recorded on non-transitory computer readable media and, when executed by a computing processor, is operative to link the model code on the computing network with an interface associated with the computation model, wherein the interface specifies a set of inputs and outputs of the computation model to thereby allow the computation model to be deployed in the execution environment;
    an input value matrix module recorded on non-transitory computer readable media and, when executed by a computer processor, is operative to create an input value matrix data structure which holds multiple values that are mapped to input variables within the model code to thereby define characteristics of the computation model; and
    a minting module recorded on non-transitory computer readable media and, when executed by a computer processor, is operative to link the model code on the computing network with a non-fungible token, where the non-fungible token is stored on a decentralized ledger.

2. The platform of claim 1, wherein the computation model represents activity of an entity in a video game or a metaverse environment and wherein the multiple values define attributes of the entity with the video game environment or the metaverse environment.

3. The platform of claim 2, wherein the interface specifies actions available to the entity.

4. The platform of claim 2, wherein the execution environment changes the multiple values in response to activity by the computation model in the execution environment.

5. The platform of claim 1, wherein the model receiving module is further operative to create the model code.

6. The platform of claim 1, wherein the model code is content addressable on the computing network.

7. The platform of claim 1, wherein the input value matrix data structure is shared by a plurality of computational models that execute in different execution environments.

* * * * *